E. O. PETERSON.
HOLLOW WALL MOLDING SYSTEM.
APPLICATION FILED MAY 3, 1911.
1,033,461.
Patented July 23, 1912.
2 SHEETS—SHEET 2.
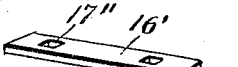
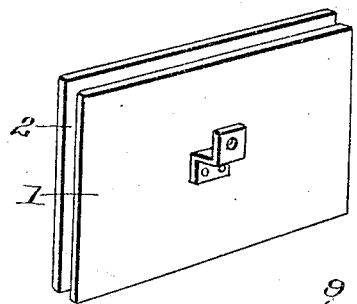
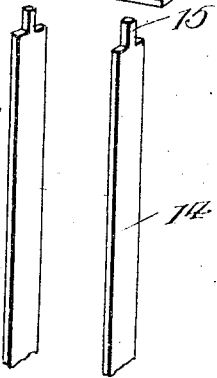
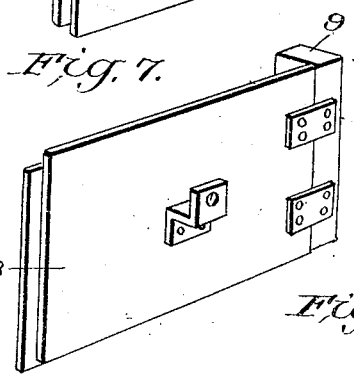
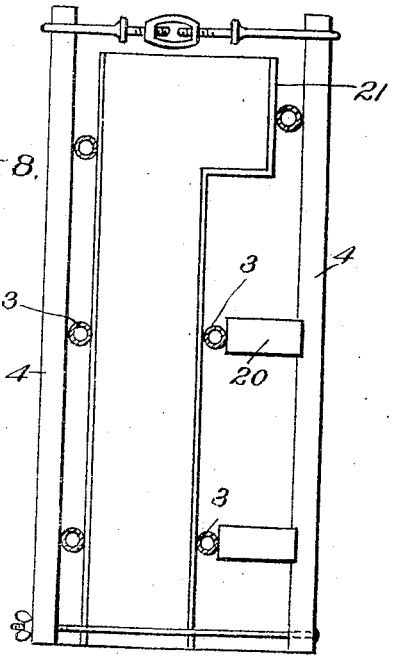
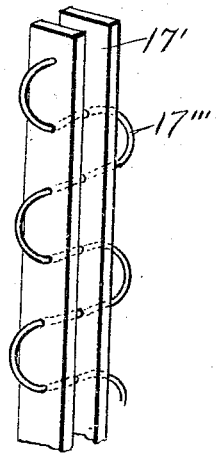
Witnesses
Inventor
E. O. Peterson
By _____, Attorneys.

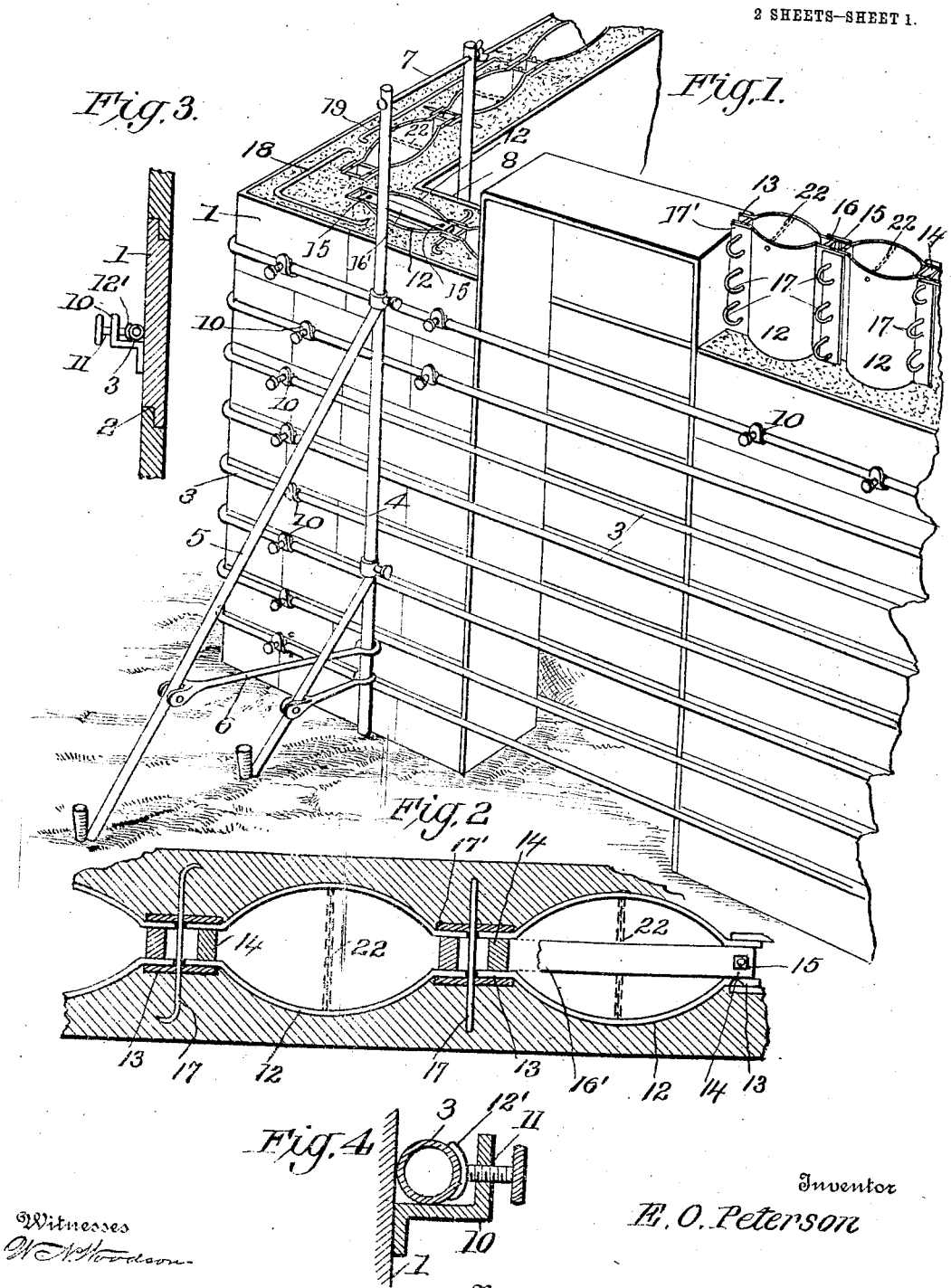

UNITED STATES PATENT OFFICE.

EDWIN O. PETERSON, OF ELGIN, NEBRASKA.

HOLLOW-WALL-MOLDING SYSTEM.

1,033,461.     Specification of Letters Patent.     Patented July 23, 1912.

Application filed May 3, 1911. Serial No. 624,847.

*To all whom it may concern:*

Be it known that I, EDWIN O. PETERSON, citizen of the United States, residing at Elgin, in the county of Antelope and State of Nebraska, have invented certain new and useful Improvements in Hollow-Wall-Molding Systems, of which the following is a specification.

This invention relates to hollow wall molding systems, and has for its object to provide means whereby a wall may be formed with spaced inner and outer portions which are effectually locked together and braced, the system including mold sections which may be removed from the interior of the wall as the said wall is completed, leaving therein the tying devices above referred to.

With this object in view the system includes inner and outer wall plates which are provided with overlapping edge portions, and means for holding said plates in proper relative positions. Mold sections are positioned between the inner and outer face plates and may be removed from the wall as the same is completed. The system also includes tying and reinforcing members, as will be hereinafter explained.

For a full understanding of the invention reference is to be had to the following description and accompanying drawings, in which:

Figure 1 is a perspective view of a portion of a wall formed by the use of the present system; Fig. 2 is a horizontal sectional view of a wall section showing the interior molds of the system in position therein; Fig. 3 is a sectional view of wall face plates used in the system; Fig. 4 is a transverse sectional view of a thrust screw used for holding the wall face plates in position; Fig. 5 is a perspective view of one of the wall face plates; Fig. 6 is a perspective view of the end portions of bars used in the system; Fig. 6ª is a perspective view of locking strips used in the apparatus; Fig. 7 is a perspective view of a interior wall face plate used in the system; Fig. 8 is a transverse sectional view of a section of wall, illustrating the manner in which a cornice is formed upon the same; and Fig. 9 is a perspective view of a modified form of wall tying member which may be used in the present system.

Corresponding and like parts are referred to in the following description and indicated in all the views of the accompanying drawings by the same reference characters.

The system includes outer wall face plates
1 which are recessed at their edges, as at 2, the recess of one plate being adapted to receive the end portion of an adjacent plate. These plates are placed edge upon edge and are held in position by horizontal bars 3 which in turn are held in position by vertical standards 4. Braces 5 are applied to the standards 4 and rods 6 connect the lower portions of the said braces with the lower portions of the standards 4. The upper and lower ends of the standards 4 at the inner and outer sides of the wall are connected together by tie bolts 7 of which but one is shown and that in Fig. 1. The inner face plates 8 of the wall are of the same general structure as the outer face plates 1 with the exception that some of the inner plates 8 are provided with blocks 9 which are adapted to form recesses in the wall for the reception of the ends of joists. Brackets 10 are mounted upon the plates 1 and 8 and thrust screws 11 pass through the said brackets and are provided at their inner ends with clamp plates 12′ which bear against the sides of the rods 3. Therefore by adjusting the screws 11 in the brackets 10 the rods 3 are forced into close contact with the sides of the plates 1 and 8 and hold the same in position. Semi-elliptical mold sections 12 are positioned between the plates 1 and 8 at the time that the wall is being formed and the material is poured between the plates 1 and 8 and around the mold sections 12. The mold sections 12 are provided with parallel flange portions 13 and bars 14 are positioned between the flanges 13 of the adjacent mold sections 12. These bars 14 are rectangular in transverse section and are provided at their ends with reduced rectangular extremities 15. Locking strips 16′ are provided with rectangular openings 17″ which snugly receive the extremities 15 of the bars 14 and hold the said bars in proper position with relation to each other. The ends of the flanges 13 of the mold sections 12 which constitute one of the molds are spaced from the ends of the flanges of the adjacent mold. Tying devices are located between the adjacent edge portions of the molds, and the said devices consist of parallel strips 17′ and projecting rods 17 adapted to be embedded in the opposite side portions of the wall. When the material is poured between the inner and outer face plates and around the molds the said material solidifies about the strips 17' and the rods 17 and the inner and outer portions of the wall are tied together. Also angle irons 18 may be inserted in the wall at the corners thereof at the time that the same is being formed, and rods 19 may be inserted in the inner or outer portions of the wall at the time that it is being formed.

To form a cornice or other projection upon the wall, the standards 4 are spaced from each other to a greater extent than the standards at the lower portion of the wall, and blocks 20 are inserted between the upper standards 4 and the horizontal bars 3, as shown in Fig. 8 of the drawings. A mold section 21 is positioned between the upper ends of the standards 4 and into this section the cornice or other projection is formed. The mold sections 12 of each unit of the mold are connected together by chains 22, or equivalent flexible members and as a section of the wall is completed the strips 16' are lifted off of the extremities 15 of the bars 14 and the said bars are moved laterally from between the flanges 13 at the opposite sides of the mold unit and then are lifted out of the space between the mold sections 12. By using the chain 22 the mold sections 12 are lifted out of the opening formed in the wall, while the tying devices of which the strips 17' and rods 17 form component parts are left in the wall.

In the form of the tying device as illustrated in Fig. 9 of the drawings, a rod 17''' is bent with a series of manifolds which are passed transversely through the strips 17' and which project beyond the outer surfaces of the said strips. These projecting portions of the rod 17''' are embedded in the opposite side portions of the wheel when it is formed.

Having thus described the invention, what I claim as new is:—

1. A wall molding apparatus, comprising inner and outer plates, means for supporting said plates, mold units for insertion between the plates and consisting of side sections having their edge portions spaced from each other, a flexible member connecting the sections together, and a wall tying device consisting of spaced strips and projecting rods insertible through the space between the edges of the adjacent mold units.

2. In a wall molding apparatus, a mold unit composed of semi-elliptical side sections having parallel spaced edge flanges, a flexible member connecting the sections together, bars rectangular in transverse section inserted between the flanges of the sections and having reduced extremities, strips having openings which snugly receive the said extremities, and wall tying devices positioned between the flanges of the mold section.

3. In a wall molding apparatus, a unit composed of semi-elliptical sections having parallel edge flanges, a flexible member connecting the sections together, bars rectangular in transverse section insertible between the flanges of the sections of the unit, said bars having reduced extremities, strips having openings which snugly receive said extremities, a wall tying device consisting of strips adapted to receive between them the edge portions of the sections and a rod attached to the strips and having portions which project beyond the outer sides of the strips.

In testimony whereof, I affix my signature in presence of two witnesses.

EDWIN O. PETERSON. [L. S.]

Witnesses:
 JOE MOSER,
 CHARLES E. GARD.